(12) United States Patent
Karp et al.

(10) Patent No.: US 7,596,694 B1
(45) Date of Patent: Sep. 29, 2009

(54) SYSTEM AND METHOD FOR SAFELY EXECUTING DOWNLOADED CODE ON A COMPUTER SYSTEM

(75) Inventors: Alan Karp, Palo Alto, CA (US); Arindam Banerji, Sunnyvale, CA (US); Thomas Wylegala, Santa Clara, CA (US); Rajiv Gupta, Los Altos, CA (US); Peter Phaal, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 839 days.

(21) Appl. No.: 10/796,690

(22) Filed: Mar. 8, 2004

(51) Int. Cl.
*H04L 29/06* (2006.01)
(52) U.S. Cl. ...................................... 713/164
(58) Field of Classification Search ................. 713/167, 713/164, 166
See application file for complete search history.

(56) References Cited

U.S. PATENT DOCUMENTS 7,107,448 B1\* 9/2006 MacKay et al. ............. 713/171
2003/0074567 A1\* 4/2003 Charbonneau .............. 713/186

\* cited by examiner

*Primary Examiner*—Gilberto Barron, Jr.
*Assistant Examiner*—Martin Jeriko P San Juan

(57) ABSTRACT

Embodiments of the present invention include a system and method for making it safe to execute downloaded code. The method includes accessing an application, the application making a system call to a library of a computer system for a resource, establishing a requesting thread. The method further includes the library sending a request message to a local security filter; the local security filter validating the requesting thread and returning a digital signature, that uniquely identifies the requesting thread, to the application. The application making a system call to a kernel of the computer system wherein the kernel uses the digital signature from the security filter to validate the requesting thread before allowing access to the requested resource.

25 Claims, 5 Drawing Sheets

400

Accessing a resource request associated with an application.
401

Routing the resource request to a security filter, the security filter comprising a validation secret.
403

The security filter validating the resource request and generating a first check value associated with the resource request using the validation secret.
405

Routing the resource request to a system kernel wherein the system kernel comprises the validation secret.
407

The system kernel generating a second check value associated with the resource request based on the validation secret.
409

Allowing access to the resource if the first check value and the second check value match.
410

FIG. 4

SYSTEM AND METHOD FOR SAFELY EXECUTING DOWNLOADED CODE ON A COMPUTER SYSTEM

FIELD OF THE INVENTION

The present invention relates to the field of computer security and more specifically, embodiments of the present invention relate to making it safe to execute downloaded code.

BACKGROUND OF THE INVENTION

The Internet has had a major impact on the way business is done. Few businesses would want to disconnect themselves from the Internet, but the current proliferation of active web pages is making it easier for hackers to penetrate systems.

It is possible to specify a fine-grained access policy. For example, the Java 1.2 specification allows a user to limit the access permission to files depending on the source of the applet. Unfortunately, this security depends on the applet being run through the Java byte code interpreter. Thus, these controls are not enforceable for native code, code written in languages such as C, C++, and Visual Basic, as often found in ActiveX controls.

One approach to providing the same kind of fine-grained control similar to the Java 1.2 specification is to modify the library commands used to access the resource to be protected. For example, to limit access to files, one could modify the file access library. Unfortunately, applications are currently not required to link with the modified library.

Unfortunately, there is currently no way to force an application to link with the modified library. A malicious hacker could write an ActiveX control that calls the operating system kernel directly or could statically link the code with a version of the library that doesn't enforce security.

SUMMARY OF THE INVENTION

Embodiments of the present invention include a system and method for making it safe to execute downloaded code. The method includes accessing an application process, the application process making a system call to a library of a computer system for a resource, establishing a requesting thread. The method further includes the library sending a request message to a local security filter; the local security filter validating the requesting thread and returning a digital signature, that uniquely identifies the requesting thread, to the application process. The application process making a system call to a kernel of the computer system wherein the kernel uses the digital signature from the security filter to validate the source of the requesting thread before allowing access to the requested resource.

BRIEF DESCRIPTION OF THE DRAWINGS

The above and other objects and advantages of the present invention will be more readily appreciated from the following detailed description when read in conjunction with the accompanying drawings, wherein:

FIG. 4 is a data flow diagram of an exemplary process for determining the source of a resource request in accordance with embodiments of the present invention.

DETAILED DESCRIPTION OF THE INVENTION

Figure 1:
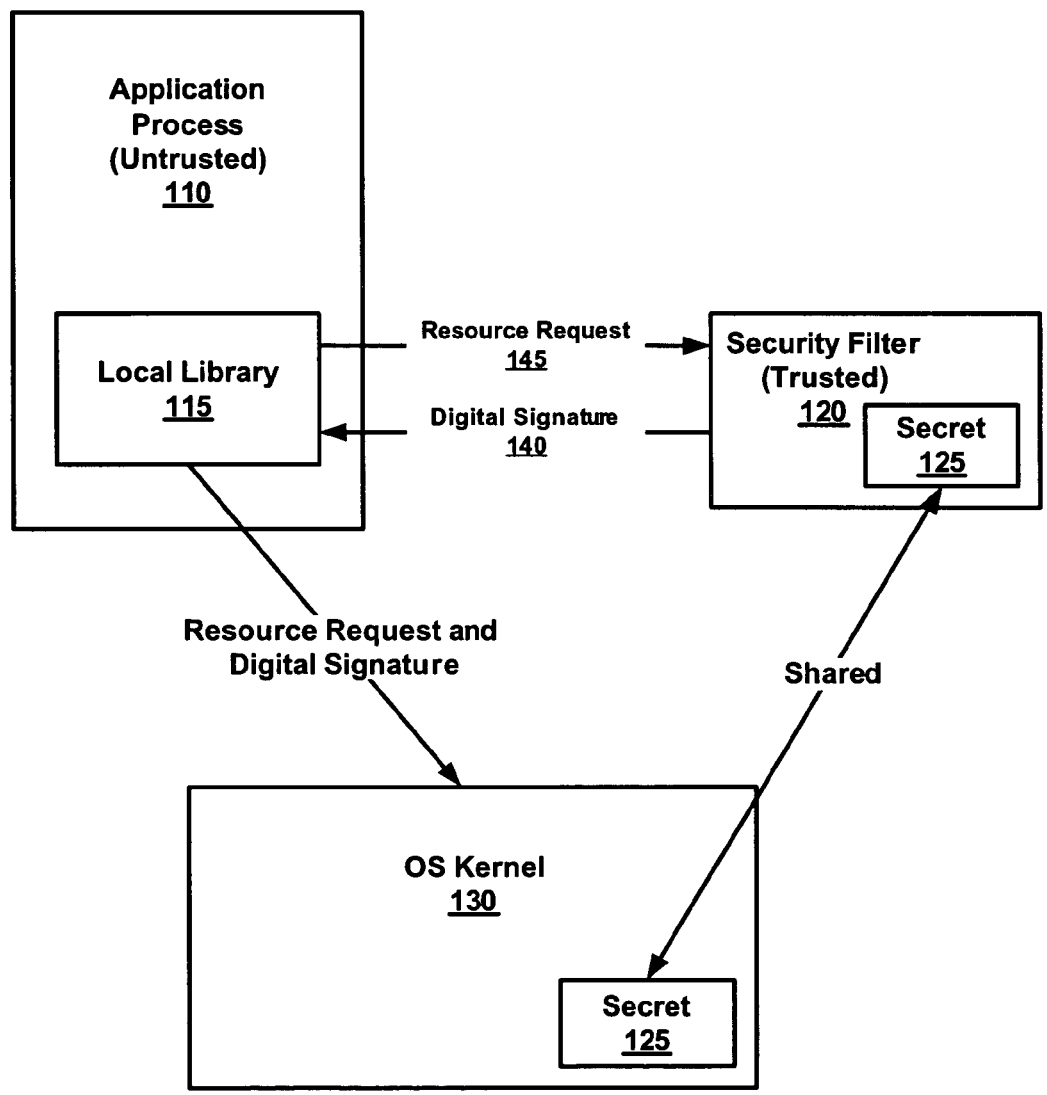
FIG. 1 is a block diagram of an exemplary computer system comprising a security filter that generates a digital signature corresponding to a resource request and returns the digital signature to a local library in accordance with embodiments of the present invention.

Reference will now be made in detail to embodiments of the present invention, a system and method for making it safe to execute downloaded code, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

When a computer system accesses a web page, the computer system is put at risk if software is downloaded. Even if a computer system is modified so that the downloaded application accesses system resources through a local library, there is not an easy way to prevent the application from making calls directly to the operating system kernel and bypassing the local libraries. Embodiments of the present invention ensure that any downloaded application that attempts to bypass the local machine's libraries will fail.

There are many ways to catch system calls to the kernel. However, most require changes to the kernel ranging from modest to heroic and some require changes to the applications or the libraries they call. Embodiments of the present invention require only a small change to the kernel, and it protects against malicious applications that do not follow conventional rules for applications and libraries. The present invention allows the kernel to determine if a resource request went through the local libraries or not. If the resource request passes through the local libraries and the operation is allowed, the kernel will allow access to the requested resource. If the resource request bypasses the local libraries, the kernel will deny the resource request.

Embodiments of the present invention provide a library that guards access to the operating system and enforces a specified security policy for all physical resources on the system. For example, embodiments of the present invention can be used to check every attempt to open a file against a list of files that may be seen by the application. Embodiments of the invention enforce security policies such that all accesses to the file system go through this library. The present invention assigns a unique digital signature to valid resource requests that pass through the local library to notify the kernel that the resource did, in fact, pass through the local library (e.g., security filter).

Embodiments of the present invention include a security policy that limits the damage a malicious application process could do to a computer system if downloaded and executed. For example, the security policy could prevent application processes from reading the local hard drive and could limit write operations to a specific directory. For example, the security policy could insure that any code running in a web browser can only write to a specific directory and cannot read the hard drive. In one embodiment of the invention, modifying the local library creates the security policy. In one embodiment of the invention, the local library is an ntdll.dll library.

FIG. 1 is a block diagram of an exemplary computer system 100 for making it safe to execute downloaded code in accordance with embodiments of the present invention. System 100 comprises an un-secure application process 110 and an associated local library 115. For example, application process 110 could be an applet, java script, an activeX control or any other executable command. In one embodiment of the invention, the application process 110 is downloaded from the Internet via a web browser application. In one embodiment of the invention, local library 115 is an ntdll.dll library.

System 100 also comprises a security filter 120. In one embodiment of the invention, local library 115 is modified to include security filter 120 and secret 125. The security filter application can be configured to limit read and write operations for many different application processes. To make sure that malicious processes do not bypass the security filter, the security filter 120 comprises secret 125 that can be used to generate a unique digital signature for individual resource requests of requesting threads made by the application process 110. In one embodiment of the invention, the secret 125 can be shared with the operating system (OS) kernel 130.

In one embodiment of the invention, the local library 115 can be modified such that legitimate resource requests made by the application process 110 are sent through the security filter 120 before being routed to the operating system (OS) kernel 130. The resource request 145 is routed to the security filter 120 so that the security filter 120 can generate a first unique digital signature 140 for verifying that the resource request was passed through the local library 115. In one embodiment of the invention, the security filter 120 generates a validation key that validates both the requesting thread ID and the actual resource request of the requesting thread.

In this embodiment of the invention, the kernel 130 is also modified such that it too shares secret 125 with the security filter 120. By sharing the secret 125, the system kernel can verify that the security filter signed the request. If the request is properly signed, the resource request can be processed. If the request not is properly signed, it can be determined that the resource request did not pass through the local library 115 and the resource request will be denied. In this embodiment of the invention, the operating system kernel 130 can tell the difference between system calls that come from the modified library and ones that bypass the modified library, thus making it safe to execute downloaded code because the downloaded code must pass through the security filter and only authorized requests will be properly signed. In one embodiment of the invention, the system kernel 130 computes its own validation key and compares it to a stored value generated by the security filter 120. If the two validation keys match, the request can be processed. If the two validation keys do not match, the request is denied. This embodiment is used as an example, but it is appreciated that variations for validating the request can be used. For example, the kernel 130 could validate the signature (validation key) without computing a second digital signature.

Figure 2:
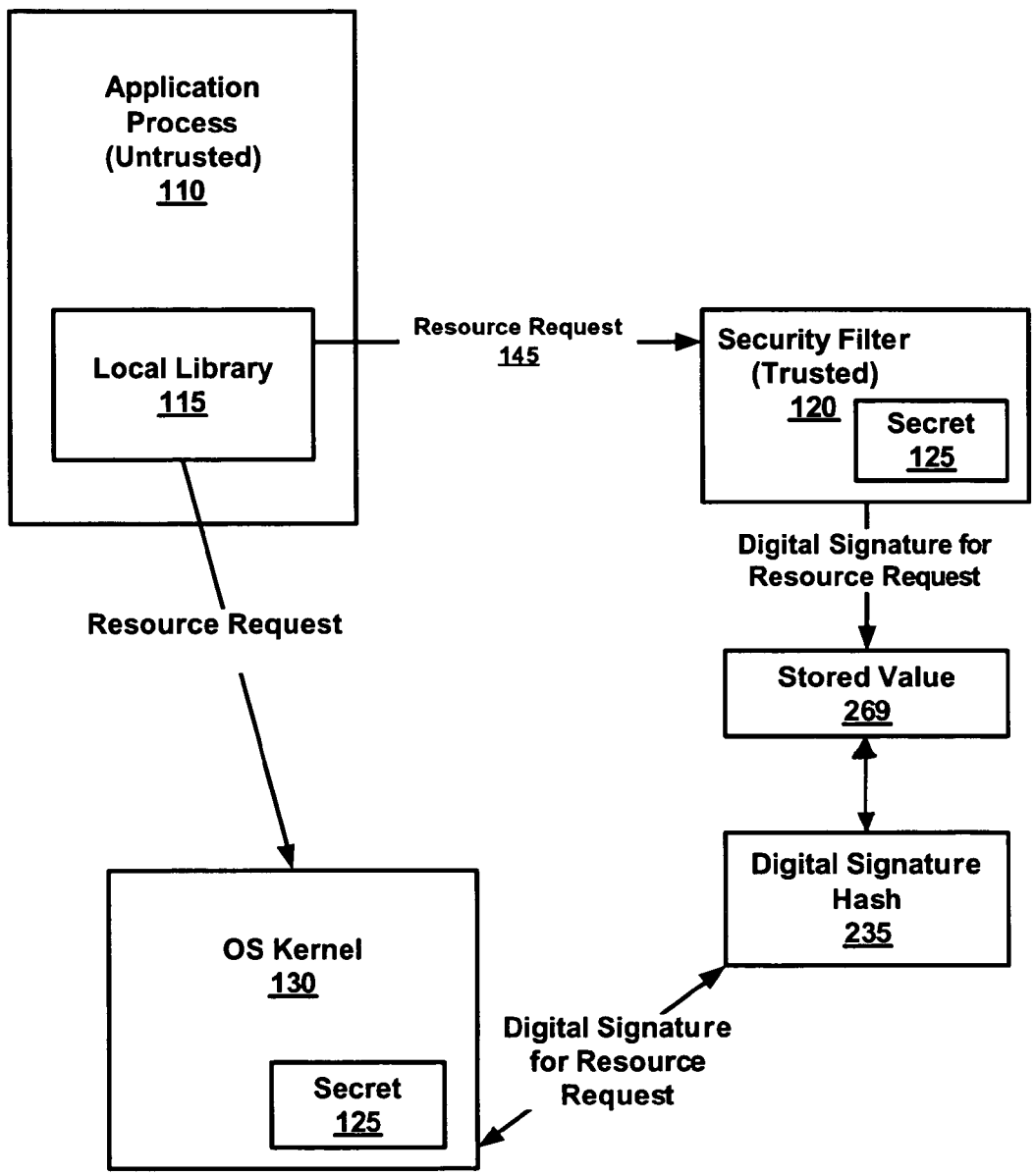
FIG. 2 is a block diagram of an exemplary system comprising a security filter that generates a digital signature corresponding to a resource request and stores the digital signature in a table in accordance with embodiments of the present invention.

FIG. 2 is a block diagram of an exemplary system 200 for making it safe to execute downloaded code in accordance with embodiments of the present invention. System 200 is slightly different from system 100 of FIG. 1. System 200 further includes a stored value 269 generated by the security filter 120 and a digital signature hash table 235 for storing digital signatures generated by the OS kernel 130. By storing the digital signature in hash table 235, the key is not passed while it is valid. Alternatively, the kernel accesses the stored digital signature and compares the stored signature to one it generates upon receiving the resource request. As stated above, the digital signature can be validated without the OS kernel 130 computing a second digital signature. This embodiment is used only as an example to facilitate describing the invention. The OS needs to validate that the request and requesting thread have passed through the security filter and were approved by the security filter. Computing digital signatures at the security filter and at the OS kernel is only one way to accomplish this.

Figure 3:
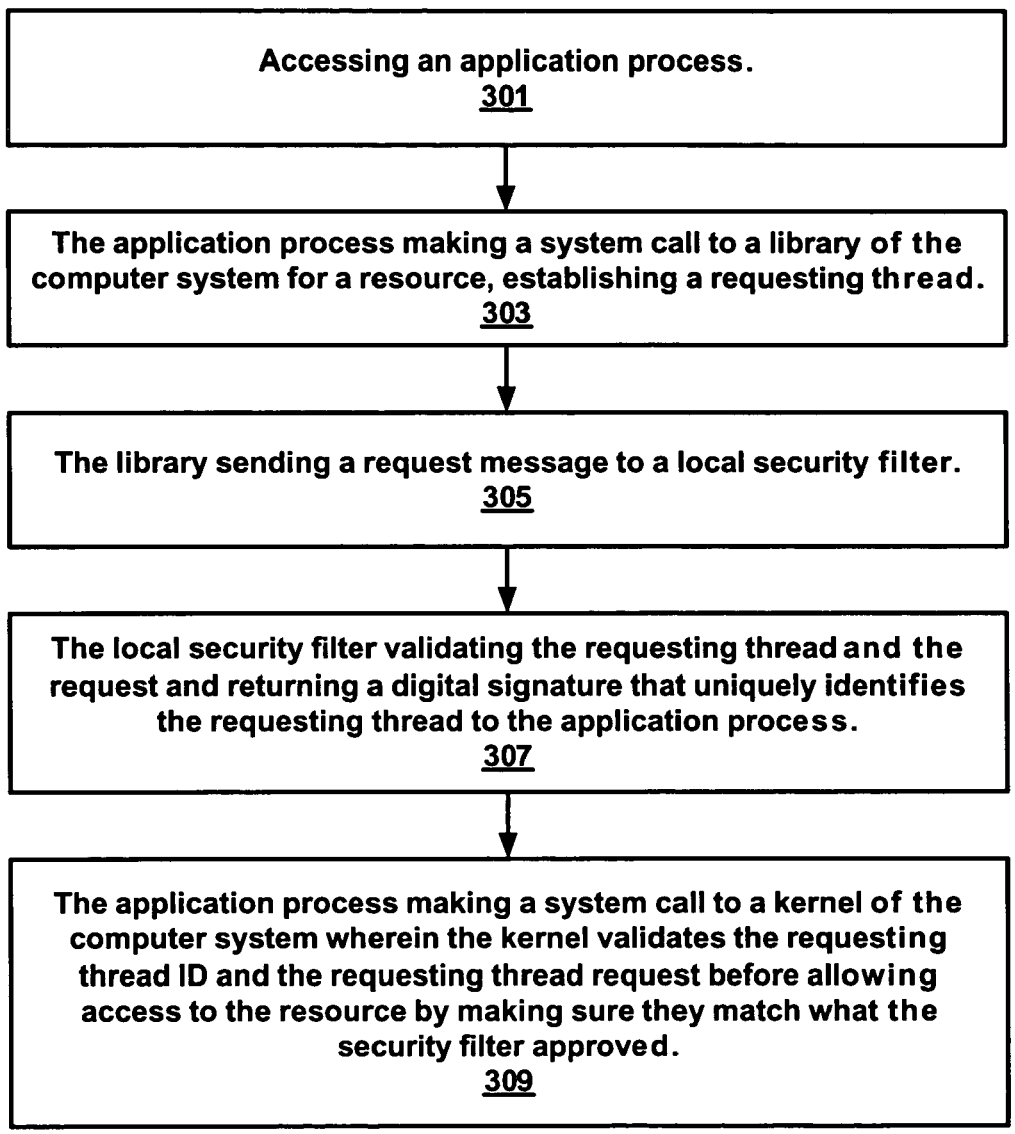
FIG. 3 is a data flow diagram of an exemplary process for making it safe to execute downloaded code in accordance with embodiments of the present invention.

FIG. 3 is a data flow diagram of an exemplary process 300 for making it safe to execute downloaded code in accordance with embodiments of the present invention. Step 301 is accessing an application process. In one embodiment of the invention, the application process is downloaded using a web browser application.

In step 303, the application process makes a system call to the local library requesting a resource, establishing a requesting thread. In one embodiment of the invention, the requesting thread comprises information necessary to uniquely identify it from other requesting threads. In one embodiment of the invention, a multiprocessor computer system can be utilized and in this embodiment, requesting threads can be uniquely identified.

In step 305, the library sends a request message to the security filter. In one embodiment of the invention, the security filter is running in a separate address space from the application (e.g., separate processes). When the application calls the kernel via the locally installed library, some internal processing may be done. However, in one embodiment of the invention, the request message can be sent directly from the application.

In step 307, the security filter validates the requesting thread and its request (e.g., determines if the requested resource access is allowed by this thread), and returns a unique digital signature for the request made by this thread to the application process. In one embodiment of the invention, the unique digital signature can only be used for the exact command specified by the requesting thread. In another embodiment, the unique digital signature can be used only for one time.

In step 309, the application process makes a system call to the OS kernel. In this step, the digital signature can be sent in the system call to the kernel. The kernel then uses the same secret that the security filter used to generate the first digital signature to validate the origin and contents of the system call. If the system call was routed from the local library (e.g., security filter) the kernel be able to verify the digital signature generated by the security filter. In one embodiment of the invention, the secret used to digitally sign the requesting thread is a one-way function (e.g., trap door function).

FIG. 4 is a data flow diagram of an exemplary process 400 for determining the source of a resource request in accordance with embodiments of the present invention.

In step 401, a resource request associated with an application is accessed. As stated above, the resource request can be in response to code downloaded, e.g., from the Internet.

In step 403, the resource request is routed to a security filter. In one embodiment of the invention, the security filter comprises a secret used for generating a secure digital signature. In another embodiment of the invention, the security filter is loaded into an address that the application does not have access to. In this embodiment, the secret may not be needed because the security rules cannot be modified by the application. In this embodiment of the invention, the kernel can determine if the resource is allowed based on the address of the request.

In step 405, the security filter validates the resource request and if it is allowed, the security filter generates a first check value (e.g., digital signature) associated with the resource request using the validation secret. In one embodiment of the invention, the check value is stored in a hash table. In another embodiment of the invention, the digital signature is routed back to the application process associated with the resource request.

In step 407, the resource request is routed to the system kernel. In one embodiment of the invention, the system kernel validates the resource request by examining the address of the resource request. In another embodiment of the invention, the system kernel validates the resource request by generating a second check value using the same secret used to generate the first check value. The kernel then compares the first check value to the second check value.

In step 410, the kernel allows access to the requested resource if the first check value and the second check value match. Moreover, the kernel denies access to the requested resource if the first check value does not match the second check value. In another embodiment of the invention, the kernel allows access to the requested resource if the requesting thread is associated with a virtual address approved by the security filter. In addition, the kernel will deny access to the requested resource if the requesting thread is associated with an address that is not approved by the security filter.

In one embodiment of the invention, if it is not possible for application code to execute once the standard library has been entered, the security code can be linked as part of the application. In this embodiment, a linker can report to the kernel the address of a specific instruction in the security code. When the kernel is accessed from this address, it produces a key. The security filter then does its security checks. If the access is allowed, the kernel can validate that the parameters of the call are those reported when the security filter was entered. In one embodiment of the invention, once a key is used, it becomes invalid.

On a multiprocessor computer system, one thread may attempt to read the live key of another thread. In one embodiment of the invention, any request made by one thread using the key of another thread will be rejected. One thread may read the key from another thread and pass it back to the thread owning the key, but the thread will not have an opportunity to use the key before it expires.

Figure 5:
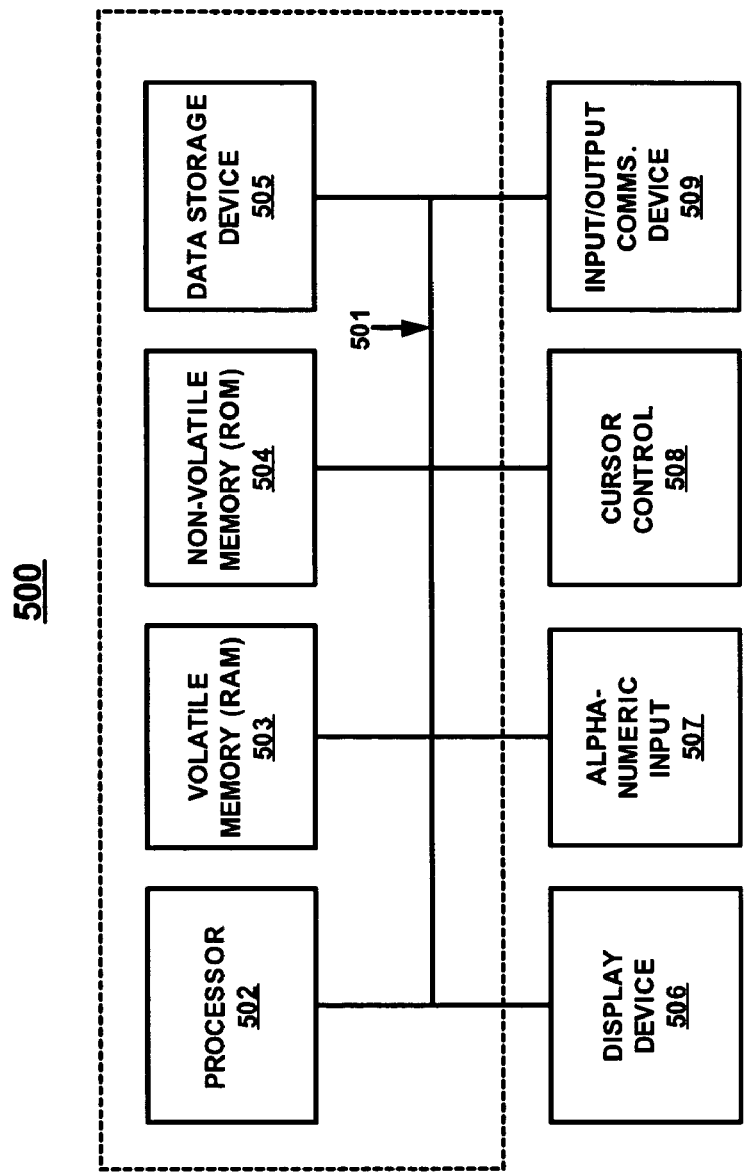
FIG. 5 is a block diagram of an exemplary computer system in accordance with embodiments of the present invention.

Referring now to FIG. 5, a block diagram of exemplary computer system 500 is shown. It is appreciated that computer system 500 of FIG. 5 described herein illustrates an exemplary configuration of an operational platform upon which embodiments of the present invention can be implemented. Nevertheless, other computer systems with differing configurations can also be used in place of computer system 500 within the scope of the present invention. For example, computer system 500 could be a server system, a personal computer or an embedded computer system such as a mobile telephone or pager system. Furthermore, computer system 500 could be a multiprocessor computer system.

Computer system 500 includes an address/data bus 501 for communicating information, a central processor 502 coupled with bus 501 for processing information and instructions, a volatile memory unit 503 (e.g., random access memory, static RAM, dynamic RAM, etc.) coupled with bus 501 for storing information and instructions for central processor 502 and a non-volatile memory unit 504 (e.g., read only memory, programmable ROM, flash memory, EPROM, EEPROM, etc.) coupled with bus 501 for storing static information and instructions for processor 502. Computer system 500 may also contain an optional display device 506 coupled to bus 501 for displaying information to the computer user. Moreover, computer system 500 also includes a data storage device 505 (e.g., disk drive) for storing information and instructions.

Also included in computer system 500 of FIG. 5 is an optional alphanumeric input device 507. Device 507 can communicate information and command selections to central processor 502. Computer system 500 also includes an optional cursor control or directing device 508 coupled to bus 501 for communicating user input information and command selections to central processor 502. Computer system 500 also includes signal communication interface 509, which is also coupled to bus 501, and can be a serial port. Communication interface 509 can also include number of wireless communication mechanisms such as infrared or a Bluetooth protocol.

Embodiments of the present invention, a system and method for making it safe to execute downloaded code have been described. While the present invention has been described in particular embodiments, it should be appreciated that the present invention should not be construed as limited by such embodiments, but rather construed according to the following Claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer-implemented method for safely executing downloaded code on a computer system comprising:

accessing an application process of said computer system, wherein said application process makes a system call to a library of said computer system for a resource, establishing a requesting thread;

sending a request message from said library of said computer system to a local security filter of said computer system;

validating said requesting thread at said local security filter of said computer system and returning a digital signature that uniquely identifies said requesting thread to said application process; and making a system call from said application process to a kernel of said computer system wherein said kernel uses said digital signature from said security filter to validate said requesting thread before allowing access to said resource at said computer system.

2. The computer-implemented method as recited in claim 1 further comprising:
   sharing a secret between said security filter and said kernel wherein said secret is used by said security filter to generate said digital signature and is used by said kernel to validate said digital signature at said computer system.

3. The computer-implemented method as recited in claim 1 wherein said library is a standard ntdll.dll library.

4. The computer-implemented method as recited in claim 1 further comprising:
   restricting said security filter to an address space that is not accessible by said application.

5. The computer-implemented method as recited in claim 1 further comprising:
   said kernel denying access to said resource if said digital signature can not be validated.

6. The computer-implemented method as recited in claim 1 further comprising:
   downloading executable code initiating said application process at said computer system.

7. The computer-implemented method as recited in claim 1 further comprising:
   modifying said kernel such that only system calls that pass through said local library are allowed by said kernel.

8. The computer-implemented method as recited in claim 1 further comprising:
   restricting access of said application process to said resource for one command based on said digital signature.

9. The computer-implemented method as recited in claim 8 further comprising:
   restricting access of said application process to said resource for one time based on said digital signature.

10. A computer-implemented method for determining the source of a resource request comprising:
    accessing a resource request associated with an application of a computer system;
    routing said resource request to a security filter of said computer system, said security filter comprising a validation secret;
    validating said resource request at said security filter and generating a first check value associated with said resource request using said validation secret;
    routing said resource request to a system kernel of said computer system wherein said system kernel comprises said validation secret;
    generating a second check value associated with said resource request based on said validation secret at said system kernel; and
    allowing access to said resource at said computer system if said first check value and said second check value match.

11. The computer-implemented method as recited in claim 10 further comprising:
    denying access to said resource at said computer system if said first check value and said second check value are different.

12. The computer-implemented method as recited in claim 10 further comprising:
    storing said first check value in a secure address space of said computer system that is not accessible to said application.

13. The computer-implemented method as recited in claim 12 further comprising:
    said system kernel retrieving said first check value from said secure address space.

14. The computer-implemented method as recited in claim 10 wherein said first check value is a digital signature.

15. The computer-implemented method as recited in claim 10 further comprising:
    restricting access of said application to said resource for a single resource request.

16. The computer-implemented method as recited in claim 10 further comprising:
    restricting access of said application to said resource for a single time.

17. The computer-implemented method as recited in claim 10 further comprising:
    allowing only resource requests that pass through said security filter to be processed by said system kernel.

18. The computer-implemented method as recited in claim 10 further comprising:
    downloading executable content using said application at said computer system.

19. The computer-implemented method as recited in claim 10 further comprising:
    modifying said kernel such that only system calls that pass through said security filter are processed by said kernel.

20. A computer system for making it safe to execute downloaded code, said computer system comprising:
    a processor; and
    a computer readable storage medium;
    wherein a portion of said computer readable storage medium is configured with a modified local library associated with an application, said local library coupled to a security filter wherein said security filter comprises a secret for generating a first digital signature associated with a resource request from said application; and
    wherein said processor of said computer system is configured for executing a system kernel for processing said resource request, said system kernel comprising said secret for generating a second digital signature associated with said resource request wherein said kernel denies said resource request if said first digital signature and said second digital signature are different.

21. The computer system as recited in claim 20 wherein said application is a web browser.

22. The computer system as recited in claim 20 wherein said local library is a ntdll.dll library.

23. The computer system as recited in claim 20 wherein said security filter is located in an address space that is not accessible by said application.

24. The computer system as recited in claim 20 wherein said digital signature verifies that said resource request originated from said local library.

25. The computer system as recited in claim 24 wherein said system kernel distinguishes between resource requests that come from said local library and resource calls that come from outside said local library wherein only resource calls that come from said local library are processed.

* * * * *